Nov. 8, 1949     A. C. COUTANT ET AL     2,487,222
LOCKING DEVICE FOR LENS-CARRYING CAMERA TURRETS
Filed Sept. 12, 1947
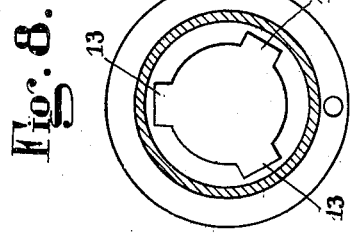
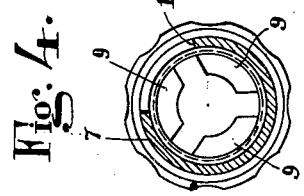
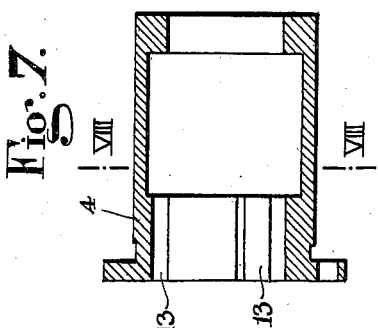
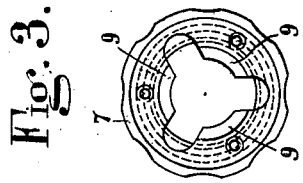
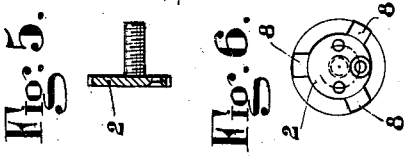
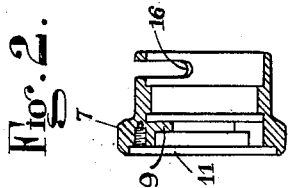
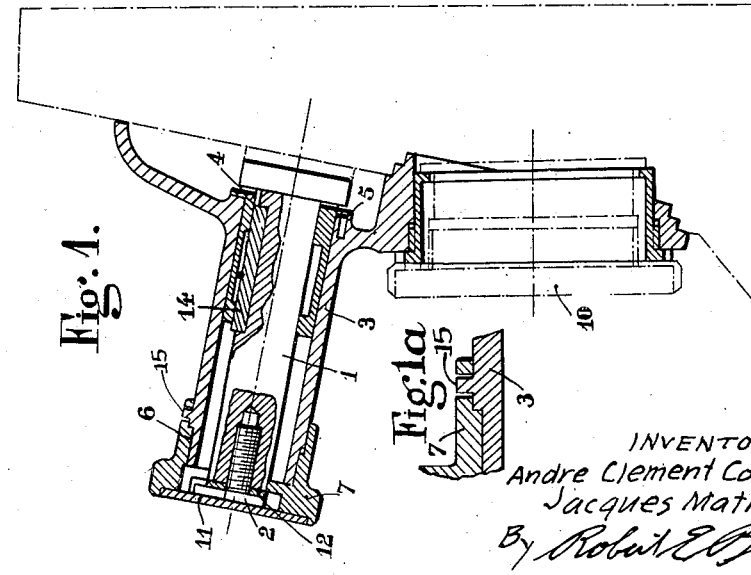
INVENTORS
Andre Clement Coutant
Jacques Mathot
By Robert E. Burns
ATTORNEY Patented Nov. 8, 1949

2,487,222

UNITED STATES PATENT OFFICE 2,487,222

LOCKING DEVICE FOR LENS-CARRYING CAMERA TURRETS

André Clément Coutant and Jacques Mathot, Paris, France

Application September 12, 1947, Serial No. 773,590
In France August 31, 1946

6 Claims. (Cl. 88—57)

1

This invention relates to a locking device for a lens-carrying turret in a kinematographic or photographic camera.

A lens carrying turret generally comprises a tubular member surrounding a stationary pivot, a locking device adapted to lock the turret on its pivot and means for changing the lens in use by means of an outwards shifting of the turret along the pivot, a rotating movement of a suitable angle round the pivot and then an inwards longitudinal shifting of the turret so to give another lens a right position for its use.

The main object of this invention is to provide in a locking device a screw the head of which is provided with at least one side projecting part which screw is secured to the end of the pivot in an adjustable manner and a tubular cap adapted to rotate round the end of the said tubular member with sliding longitudinally thereon, the said cap comprising an annular member provided with as many slots as there are lenses, the cap having such a longitudinal position with reference to the screw that the annular member provided with at least one side projecting part is located outwards or inwards with reference to the head of said screw according as the turret is in its position for use or in its position for the change of the lens in use, the hollow parts and the side projecting parts being so distributed that the longitudinal shifting of the lens-carrying turret is possible, a rotary motion of the cap in a suitable direction ensuring the locking of the turret in its position for use by the tightening of the annular member of the cap under the side projecting parts of the head of the screw.

The screw secured to the end of the pivot may be provided with as many side projecting parts as there are lenses.

Another object of the invention is to provide a socket rigidly secured to the said tubular member of the turret, which socket cooperates with the said screw to limit the longitudinal shifting of the turret.

The locking device according to the invention may be particularly applied to cameras wherein the optical axes of the various lenses are distributed on generatrices of a circular cone of revolution whose axis defines with the axis of view the same angle as with the generatrices. That disposition which gives the various lenses divergent directions, allows therefor to arrange them in a small space without increasing the encumbrance, even if it comprises lenses having short focus and lenses having long focus and even if those latter are capped with sun-guards,

2 without risking to place a lens within the field of another.

The lenses may be arranged on an inclined conical disc whose axis coincides with that of the said cone on the generatrices of which the optical axes of the lenses are distributed, the said conical disc having an angle at its apex supplemental of that of said cone and being adapted to rotate about the said common axis.

In cameras of this type, locking devices are already known, for instance the lens-carrying turret may rotate only when a traction has been exerted thereon contrawise the action of a spring, thus giving the turret a rectilinear translation or shifting along its axis towards the outside of the apparatus.

The improvement the present invention has for its object consists in canceling that spring and in providing, in lieu of that spring, a cap which is adapted to be secured, for instance by means of threads, on the tubular member of the turret and to come in engagement and to be locked with the end of the pivot of the apparatus.

An embodiment of the invention is described below with reference to the accompanying drawings in which:

Figure 1 is a longitudinal cross-section of the turret tube and of the pivot.

Figure 1—$a$ is an enlarged part cross-section of cap, peg and turret tube of Figure 1.

Figure 2 is a longitudinal cross-section of the cap by a radial plane different of the section plane of Fig. 1.

Figures 3 and 4 are respectively front and back views of the cap.

Figures 5 and 6 are respectively side and front views of the screw secured to the end of the pivot.

Figures 7 and 8 are respectively a longitudinal cross section of a socket forming a bush bearing the turret and a cross-section of the same on line VIII—VIII of Fig. 7.

The camera is provided on its front with a pivot I in the end of which is screwed a flat-head screw 2.

The tube 3 of the turret surrounds this pivot I; this tube 3 of the turret and the pivot I are connected by means of a socket 4, provided with slots 13, which forms a bush and is secured to the tube 3 by means of a peg 5. The tube 3 comprises at its front end left-handed threads 6 on which a cap 7 is screwed, which cap is provided with means to be locked under the head of the screw 2.

The pivot I is provided with a key 14 of such a profile so as to fit in a slot 13 and thereby prevents any rotation of the socket 4 and of the turret as long as this assembly (socket and turret) is not sufficiently disengaged by translating along its axis; the three slots 13 correspond to the three positions the three lenses are adapted to take; of course as many keys 14 as slots 13 may be provided.

This locking device consists in that the screw 2 (in the case of a turret carrying three lenses) is provided with three side projecting parts 8, similar the one to the other and circumferentially spaced the one from the other by an angle of 120°, under which side projecting parts 8 three corresponding sectors 9 provided in the cap 7 are locked by screwing up the cap 7, in such a manner that a slight loosening of this cap 7 corresponding to the width of the side projecting parts 8 and to the hollow parts between the corresponding sectors 9 of the cap 7, unlocks and makes free the turret tube 3 which may be translated along the axis of the pivot 1 on a length equal to the distance between the socket 4 and the head of the locking screw 2.

Then a suitable rotation of the turret of an angle of 120°, in one or the other direction, allows to arrange one of the three lenses 10 in front of its lodging on the axis of view. Then the turret tube 3 is driven back and by screwing up the cap 7 with a fraction of a revolution the side projecting parts 8 are slid under the corresponding sectors 9 and the turret tube 3 is locked.

A protecting plate 11 is secured on the front part of the cap by means of screws. The adjustment of the screw 2 in the pivot is exactly performed by means of a regulating rundle 12.

The cap 7 may be provided with a slot 16, the tubular member 3 of the turret being provided with a peg 15 cooperating with said slot in the cap to limit the rotation of the cap when unlocking the turret.

Of course the above described threaded cap is not only adapted to lock a turret carrying three lenses and modifications may be made therein and mainly in the number of outwards projecting parts.

The relation of the parts may also be modified and the screwed cap may be arranged on more important turrets and on every apparatus on which it can be adapted. All those modifications and other similar ones are, of course, within the scope of the present invention.

What we claim as our invention and desire to secure by Letters Patent is:

1. In a device for locking a lens-carrying camera turret on its pivot in which the turret includes a tubular part fixed on said pivot and the means allowing the changing of the lens by the longitudinal sliding of the turret on its pivot to free the lens in its position for use, rotation at a suitable angle about said pivot and finally longitudinal sliding in reverse direction to bring another lens into position for use, a screw adjustably secured on at the end of the pivot having a head with at least a wing and a tubular cap capable of turning while sliding simultaneously on the end of the tubular portion of the turret, said tubular cap having an annular part provided with as many slots as there are lenses, the relative longitudinal position of the cap and screw being such that the annular part provided with slots of the cap is either on one side or the other of the head of the screw according to whether the turret is in its position for use or in free position, the slots of the annular part of the cap and wing of the head of the screw being distributed so as to allow the longitudinal sliding of the lens-carrying camera turret when the cap is in loosened position, a turning of the cap in the suitable direction causing, when the turret is in its position for use, the passing of the annular part of the tubular cap next to the slot corresponding to the wing of the head of the screw behind said wing and the simultaneous sliding of the said cap ensuring the tightening of said annular part of the cap behind the wing of the head of the screw fixed at the end of the pivot of the turret, and as a result, the locking of the turret.

2. In a device as defined in claim 1 a screw secured to the end of the pivot provided with as many side projecting parts as there are lenses.

3. In a device as defined in claim 1 a socket rigidly secured to the said tubular member of the turret, which socket cooperates with the said screw to limit the longitudinal shifting of the turret.

4. In a device as defined in claim 1 a left-hand threaded tubular cap, the said annular member of which is tightened under said side projecting wing of the head of the screw by a rotation on the right.

5. In a device as defined in claim 1 a tubular cap provided with a slot, the tubular member of the turret being provided with a peg cooperating with said slot in the cap to limit the rotation of the cap when unlocking the turret.

6. In a device for locking a lens-carrying camera turret on its pivot in which the turret includes a tubular part fixed on said pivot and the means allowing the changing of the lens by the longitudinal sliding of the turret on its pivot to free the lens in its position for use, rotation at a suitable angle about said pivot and finally longitudinal sliding in reverse direction to bring another lens into position for use, a stop integral with the end of the pivot of the turret, a second stop integral with the end of the tubular part of the turret, means allowing a relative rotation of said stops and simultaneously causing a relative sliding of said stops parallel to the axis of the pivot of the turret and an adjustment of said stops and said means so that in non-working position said stops allow the sliding of the turret on its pivot and the action of the aforementioned means causes a relative rotation of the stops bringing them opposite each other, and a simultaneous relative sliding, pressing the stop of the turret behind the rear face of the pivot stop and ensuring a real locking of the turret.

ANDRÉ CLÉMENT COUTANT.
JACQUES MATHOT.

REFERENCES CITED

The following references are of record in the file of this patent:

UNITED STATES PATENTS

| Number | Name | Date |
| --- | --- | --- |
| 1,023,390 | Ott et al | Apr. 16, 1912 |
| 1,234,795 | Ott | July 31, 1917 |
| 1,754,356 | Gordon | Apr. 15, 1930 |
| 1,754,357 | Gordon | Apr. 15, 1930 |
| 1,767,849 | Howell | June 24, 1930 |
| 1,906,059 | Hadaway | Apr. 25, 1933 |
| 2,052,261 | Vershoor | Aug. 25, 1936 |
| 2,236,069 | Robinton | Mar. 25, 1941 |